United States Patent
Lu et al.

(10) Patent No.: US 11,264,027 B2
(45) Date of Patent: Mar. 1, 2022

(54) METHOD AND APPARATUS FOR DETERMINING TARGET AUDIO DATA DURING APPLICATION WAKING-UP

(71) Applicant: BEIJING XIAOMI MOBILE SOFTWARE CO., LTD., Beijing (CN)

(72) Inventors: Kanghong Lu, Beijing (CN); Rui Yang, Beijing (CN); Xiaochuan Feng, Beijing (CN); Shiqi Cui, Beijing (CN); Wei Han, Beijing (CN); Bin Qin, Beijing (CN); Gang Wang, Beijing (CN); Dan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 133 days.

(21) Appl. No.: 16/696,402

(22) Filed: Nov. 26, 2019

(65) Prior Publication Data
US 2021/0050010 A1    Feb. 18, 2021

(30) Foreign Application Priority Data
Aug. 16, 2019   (CN) .......................... 201910760806.3

(51) Int. Cl.
*G10L 15/22*   (2006.01)
*G10L 15/08*   (2006.01)
(Continued)

(52) U.S. Cl.
CPC .............. *G10L 15/22* (2013.01); *G10L 15/08* (2013.01); *G10L 21/0232* (2013.01);
(Continued)

(58) Field of Classification Search
CPC .................................. G10L 15/22; G10L 25/87
See application file for complete search history.

(56) References Cited

U.S. PATENT DOCUMENTS

| 5,855,000 A | * | 12/1998 | Waibel | .................... | G06K 9/03 |
| | | | | | 704/235 |
| 8,843,369 B1 | * | 9/2014 | Sharifi | ................... | G10L 25/87 |
| | | | | | 704/235 |

(Continued)

FOREIGN PATENT DOCUMENTS

| CN | 106409295 A | 2/2017 |
| CN | 107068147 A | 8/2017 |

(Continued)

OTHER PUBLICATIONS

European Search Report in the European application No. 19212041.8, dated Apr. 29, 2020.

(Continued)

*Primary Examiner* — Jialong He
(74) *Attorney, Agent, or Firm* — Syncoda LLC; Feng Ma

(57) ABSTRACT

An audio processing method includes: acquiring first audio data associated with a first audio signal after waking up a target application; when second audio data associated with a second audio signal is detected in the process of acquiring the first audio data, acquiring the second audio data; and obtaining target audio data according to the first audio data and the second audio data. With the method, a conversation flow can be simplified without waking up a target application again, the first audio data and the second audio data are combined to obtain target audio data, and audio response is made to the target audio data, which can more accurately get real needs of a user, reduce the rate of isolated responding errors, and improve the accuracy of the audio response.

6 Claims, 4 Drawing Sheets

(51) Int. Cl.
  *G10L 21/0232*  (2013.01)
  *G10L 25/84*  (2013.01)
  *G10L 21/0208*  (2013.01)

(52) U.S. Cl.
  CPC ........ *G10L 25/84* (2013.01); *G10L 2015/088* (2013.01); *G10L 2015/223* (2013.01); *G10L 2021/02082* (2013.01)

(56) References Cited

U.S. PATENT DOCUMENTS

| | | | |
|---|---|---|---|
| 9,123,339 B1* | 9/2015 | Shaw | G10L 15/22 |
| 9,437,186 B1 | 9/2016 | Liu et al. | |
| 9,659,555 B1 | 5/2017 | Hilmes et al. | |
| 9,799,328 B2 | 10/2017 | Aravamudan et al. | |
| 10,013,980 B2 | 7/2018 | Borsutsky et al. | |
| 10,586,534 B1* | 3/2020 | Argyropoulos | G10L 15/22 |
| 10,832,005 B1* | 11/2020 | Mohajer | G06F 40/211 |
| 2007/0078642 A1* | 4/2007 | Weng | G10L 15/1822 704/4 |
| 2008/0243514 A1* | 10/2008 | Gopinath | G10L 15/22 704/270 |
| 2012/0101821 A1* | 4/2012 | Tsuda | G10L 15/22 704/243 |
| 2015/0310879 A1 | 10/2015 | Buchanan et al. | |
| 2016/0260427 A1 | 9/2016 | Buchanan et al. | |
| 2017/0068423 A1 | 3/2017 | Napolitano et al. | |
| 2017/0110116 A1 | 4/2017 | Tadpatrikar et al. | |
| 2017/0169821 A1* | 6/2017 | Engelhardt | B60R 16/0373 |
| 2017/0213569 A1 | 7/2017 | Jang et al. | |
| 2018/0096686 A1 | 4/2018 | Borsutsky et al. | |
| 2019/0019509 A1 | 1/2019 | Lee et al. | |
| 2019/0043480 A1 | 2/2019 | Buchanan et al. | |
| 2019/0180758 A1 | 6/2019 | Washio et al. | |
| 2019/0198019 A1 | 6/2019 | Xu et al. | |
| 2019/0279623 A1* | 9/2019 | Liu | G10L 15/18 |
| 2020/0043466 A1 | 2/2020 | Buchanan et al. | |

FOREIGN PATENT DOCUMENTS

| | | |
|---|---|---|
| CN | 107146602 A | 9/2017 |
| CN | 107146618 A | 9/2017 |
| CN | 107195303 A | 9/2017 |
| CN | 107665706 A | 2/2018 |
| CN | 107863113 A | 3/2018 |
| CN | 108172219 A | 6/2018 |
| CN | 108257616 A | 7/2018 |
| CN | 108737933 A | 11/2018 |
| CN | 108737934 A | 11/2018 |
| CN | 108986814 A | 12/2018 |
| CN | 109147779 A | 1/2019 |
| CN | 109360551 A | 2/2019 |
| CN | 109599124 A | 4/2019 |
| CN | 109599130 A | 4/2019 |
| CN | 110111789 A | 8/2019 |
| EP | 2937860 A1 | 10/2015 |
| EP | 3159893 A1 | 4/2017 |
| JP | 2006107044 A | 4/2006 |
| JP | 2015060127 A | 3/2015 |
| JP | 2017078869 A | 4/2017 |
| JP | 2019101385 A | 6/2019 |
| JP | 2019117623 A | 7/2019 |
| JP | 2019207329 A | 12/2019 |
| KR | 20170045709 A | 4/2017 |
| KR | 20180118470 A | 10/2018 |
| RU | 2349969 C2 | 3/2009 |
| WO | 2019031268 A1 | 2/2019 |
| WO | 2019107145 A1 | 6/2019 |

OTHER PUBLICATIONS

First Office Action of the Russian application No. 2019139979, dated Jun. 8, 2020.
International Search Report in the international application No. PCT/CN2019/110213, dated Apr. 17, 2020.
Notice of Allowance of the Russian application No. 2019139979, dated Sep. 9, 2020.

* cited by examiner

METHOD AND APPARATUS FOR DETERMINING TARGET AUDIO DATA DURING APPLICATION WAKING-UP

CROSS-REFERENCE TO RELATED APPLICATION

This application claims priority to Chinese patent application No. 201910760806.3 filed on Aug. 16, 2019, the disclosure of which is hereby incorporated by reference in its entirety.

BACKGROUND

Human-device interaction through voice has attracted wide attention. The entire Internet industry is actively exploring possible application modes and application scenarios of voice interaction, and a large number of products based on voice interaction have been put on the market already, such as smart sound boxes and voice assistants. The voice assistants have almost become the focus of new product release conferences of various manufacturers and influence the choices of consumers to a certain extent. However, during interaction between users and these voice assistants, the process of the conversation appears complicated and the conversation is not smooth.

SUMMARY

The present disclosure relates to the technical field of information, and more particularly to an audio processing method and apparatus, and a storage medium.

According to a first aspect of the embodiments of the present disclosure, a method for audio processing is provided. The method may be applied to an electronic device. The method may include the following operations.

First audio data associated with a first audio signal is acquired after a target application is woken up.

In response to that second audio data associated with a second audio signal is detected in the process of acquiring the first audio data, the second audio data is acquired.

Target audio data is obtained according to the first audio data and the second audio data.

According to a second aspect of the embodiments of the present disclosure, an apparatus for audio processing is provided, which may include:

a first audio acquiring portion, configured to acquire first audio data associated with a first audio signal after a target application is woken up;

a second audio acquiring portion, configured to acquire, in response to that second audio data associated with a second audio signal is detected in the process of acquiring the first audio data, the second audio data; and a first audio determining portion, configured to obtain target audio data according to the first audio data and the second audio data.

According to a third aspect of the embodiments of the present disclosure, an apparatus for audio processing is provided, which may include:

a processor; and a memory configured to store an instruction executable for the processor.

The processor may be configured to, when the instruction is executed, implement the operations of the method for audio processing in the first aspect.

According to a fourth aspect of the embodiments of the present disclosure, a non-transitory computer-readable storage medium is provided. When an instruction in the storage medium is executed by a processor of an apparatus for audio processing, the apparatus may be enabled to perform the method for audio processing in the first aspect.

It should be understood that the general descriptions above and the detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments and not intended to limit the present disclosure. "A/an" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that, although terms "first", "second", "third" and the like may be adopted to describe various information in the present disclosure, the information should not be limited to these terms. These terms are only adopted to distinguish the information of the same type. For example, without departing from the scope of the present disclosure, first information may also be called second information and, similarly, second information may also be called first information. For example, term "if" used here may be explained as "while" or "when" or "responsive to determining", which depends on the context.

Figure 1:
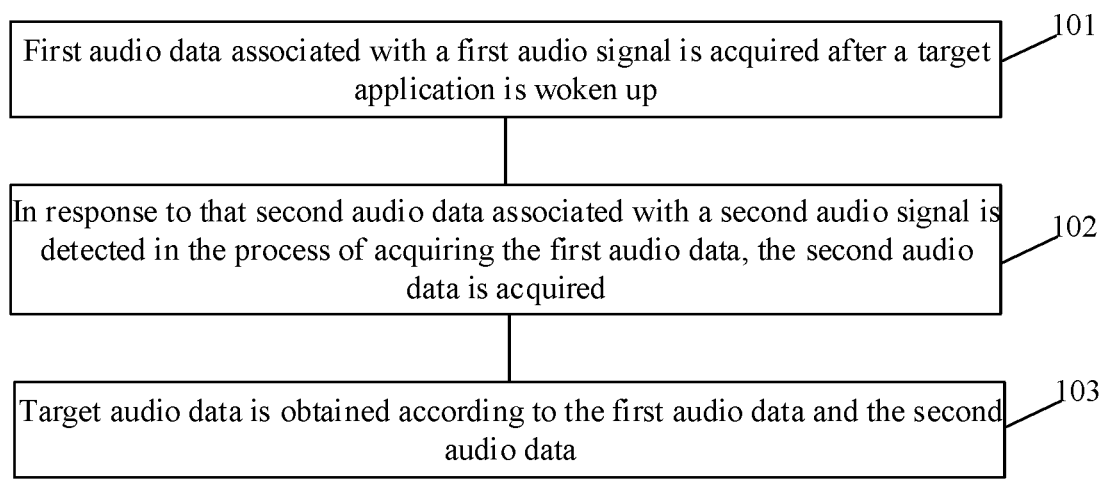
FIG. 1 is a flowchart 1 of an audio processing method according to some embodiments of the present disclosure.

FIG. 1 is a flowchart 1 of an audio processing method according to some embodiments of the present disclosure. As shown in FIG. 1, the method is applicable to an electronic device, where the electronic device may include a mobile terminal and a fixed terminal, such as a mobile phone, a tablet computer, a palmtop computer, a laptop, a desktop computer, a wearable mobile device, and a smart sound box. The method may include following operations.

In operation 101, first audio data associated with a first audio signal is acquired after a target application is woken up.

The target application may be an application that can be installed in an electronic device for performing voice interaction with a user, such as a voice assistant. The first audio signal may include a voice signal, such as, a voice signal made by a user, collected based on a sound collection component of the electronic device. The first audio data may be audio data after the first audio signal is digitized.

An audio signal may be collected by an audio collection component in the electronic device, and the audio signal may be digitized to obtain audio data. The audio collection component may be a component for collecting audio in the electronic device. For example, when the electronic device is a mobile phone, the audio collection component may be a microphone of the mobile phone.

In the embodiments of the present disclosure, the target application may be woken up by voice, and after the target application is woken up, the audio data may be acquired based on the target application.

For example, when the audio signal sent by a user is received by the audio collection component of the electronic device, the voice signal may be digitized to obtain voice data. Whether the voice data includes a preset wake-up word is detected, and when the voice data includes a wake-up word, the target application may be woken up. The wake-up word may be set by the user according to demands. For example, the wake-up word may be set to "Ai."

In operation 102, in response to that second audio data associated with a second audio signal is detected in the process of acquiring the first audio data, the second audio data is acquired.

The second audio data may be the same as the first audio data or different from the first audio data. The audio data acquired in the process of acquiring the first audio data may be referred to as the second audio data.

In operation 103, target audio data is obtained according to the first audio data and the second audio data.

After the target application acquires the first audio data and the second audio data respectively at different times, target audio data can be obtained according to the first audio data and the second audio data, so that the target application may make a response according to the target audio data.

The target audio data may include at least one of following data: the first audio data, the second audio data, and third audio data obtained by combining the first audio data and the second audio data. For example, the target audio data is the third audio data obtained by combining the first audio data and the second audio data. When the content of the first audio data is "It is . . . today" and the content of the second audio data is "Sunny", the content of the third audio data, that is, the target audio data, may be "It is sunny today."

In the embodiments of the present disclosure, after the target application is woken up, in the process of acquiring the first audio data, when the second audio data is detected, the first audio data and the second audio data can be analyzed and processed simultaneously to obtain target audio data. During a continuous conversation, a plurality of audio data can be processed directly at the same time without waking up the target application again, which not only simplifies the flow of the conversation, but also makes the voice interaction smoother.

The operation of obtaining target audio data according to the first audio data and the second audio data may include the following operations.

Target audio data is obtained according to first semantic content of the first audio data and second semantic content of the second audio data.

For example, the first semantic content and the second semantic content are mutually complementary, and the first audio data and the second audio data may be combined to obtain the target audio data, and the application scenario may be that: after a user sends a first voice signal, the user may pause or may be interrupted, and thus a second audio signal is required as a complement.

For example, the first semantic content is "Please help me", and the second semantic content is "Set an alarm clock." Semantic analysis may be made over the first semantic content and the second semantic content, and it may be determined that the first semantic content and the second semantic content complement each other. Then target audio data may be obtained by combining the first audio data and the second audio data. The final demand of a user may be determined as "Please help me set an alarm clock."

For another example, when the first semantic content and the second semantic content are contradictory, the second audio data may be used as the target audio data, and the application scenario is that a first audio signal sent by a user is incorrect and then corrected by a second audio signal.

For example, the first semantic content is "The weather in Wuhan today", and the second semantic content is "No, I want to check the weather in Beijing today." Semantic analysis may be made over the first semantic content and the second semantic content to obtain that both the first audio data and the second audio data are used for querying weather. Although the first semantic content and the second semantic content are related, the first audio data is used to query the weather in Wuhan while the second audio data is used to query the weather in Beijing, which are contradictory and can get that the first semantic content is wrong. In such a case, it can be determined that the target application does not need to process the first audio data, the second audio data may be determined as the target audio data, and response information to the second audio data may be output.

For another example, the first semantic content and the second semantic content are independent of each other, there is no semantic complement and contradiction, the first audio data and the second audio data may be used as two items of target audio data, respectively, and respective audio responses are required to be made. The application scenario is: users who are more anxious or faster in speech may send two completely separate voice signals in a short time.

Here, for example, the first semantic content is "the weather in Wuhan today", and the second semantic content is "Please help me set an alarm clock." Semantic analysis of the first semantic content and the second semantic content may get that the first semantic content and the second semantic content are not related, and the first audio data and the second audio data may respectively represent two different needs of a user. Accordingly, it may be determined that the first semantic content and the second semantic content are independent of each other, there is no semantic complement and contradiction, the first audio data and the second audio data may be used as two items of target audio data, respectively, respective audio responses may be required, and response information to the first audio data and the second audio data may be output respectively.

According to the technical solution in the embodiments of the present disclosure, it is unnecessary to wake up a target application again. Compared with the situation that next audio data cannot be processed before a response to received audio data is made, a voice interaction is smoother on the basis of the simplified conversation flow according to the present disclosure. The first audio data and the second audio data may be combined to obtain the target audio data, and an audio response to the target audio data may be made, which can more accurately get the real needs of a user, reduce the rate of isolated responding errors caused by responding to the first audio data and the second audio data respectively, and thus improve the accuracy of the audio response.

In some embodiments, the method may further include following operations.

A time difference between end of acquiring the first audio data and start of acquiring the second audio data is determined.

Correspondingly, operation 103 may include that:

when the time difference between end of acquiring the first audio data and start of acquiring the second audio data is greater than or equal to a first set duration, the target audio data is obtained according to the first audio data and the second audio data.

In the process of acquiring audio data, a user may pause a little. In such as case, the target application may determine the audio data acquired before and after the pause as the first audio data and the second audio data, respectively.

The first audio data and the second audio data are acquired at different time points and the second audio data is acquired after ending the first audio data, therefore, the electronic device may separately acquire the time of ending the acquisition of the first audio data and the time of starting the acquisition of the second audio data, and then the time difference may be obtained based on the end time and the start time.

Next, the obtained time difference may be compared with the first set duration, and when the time difference is greater than or equal to the first set duration, it may be determined that the user may be not slightly paused during the speech. In this case, the first audio data and the second audio data need to be further determined and processed to obtain target audio data. For example, the first audio data and the second audio data may be respectively used as target audio data, or the first audio data and the second audio data may be combined to obtain target audio data, etc.

When the time difference between end of acquiring the first audio data and start of acquiring the second audio data is smaller than the first set duration, it may be determined that the user is slightly paused during the speech. At this time, the first audio data and the second audio data may be directly combined into complete audio data, and the complete audio data may be used as target audio data.

In the embodiments of the present disclosure, before the target audio data is obtained, the time difference between end of acquiring the first audio data and start of acquiring the second audio data may be determined, and then whether the first audio data and the second audio data are further processed may be determined, so that unnecessary processing of the acquired audio data can be reduced.

In some embodiments, the operation of obtaining, when the time difference is greater than or equal to the first set duration, the target audio data according to the first audio data and the second audio data may include the following operations.

When the time difference is greater than or equal to the first set duration, whether the first audio data is completely input is detected.

When the first audio data is not completely input, the target audio data is obtained according to the first audio data and the second audio data.

When the time difference between end of acquiring the first audio data and start of acquiring the second audio data is greater than or equal to the first set duration, whether the first audio data is completely input may be further detected. Detecting whether the first audio data is completely input may include: acquiring first semantic content of the first audio data; making semantic analysis over the first semantic content to obtain a semantic analysis result; and determining whether the first audio data is completely input according to the semantic analysis result.

For example, the first semantic content of the first audio data is "Please help me set." After analyzing the first semantic content, although some words are included in the first semantic content, it is not enough to determine what the user's needs are based on the words contained in the first semantic content only. It can be seen that the user who sent the first semantic content may pause or be interrupted during the process of sending a voice signal, and it may be determined that the input of the first voice data is incomplete.

In some embodiments, when the first voice data is incomplete and it is detected that the user no longer inputs other audio signals, the target application may also make response information to the first audio data according to the context. For example, the first semantic content of the first audio data is "Please help me set", and the response information from the target application may be "What do you need me to help you set."

Here, whether the first audio data is completely input may be detected based on a Natural Language Processing (NLP) technology.

In some embodiments, the operation of obtaining, when the first audio data is not completely input, the target audio data according to the first audio data and the second audio data may include the following operations.

When the first audio data is not completely input, whether the first audio data and the second audio data can be combined may be determined.

When the first audio data and the second audio data can be combined, the first audio data and the second audio data may be combined to obtain the target audio data.

For example, the content of the first audio data is "It is . . . today" and the content of the second audio data is "Sunny", the content of the third audio data, that is, the target audio data, may be "It is sunny today."

In some embodiments, the method may further include that: when the first audio data is completely input, the first audio data and the second audio data are determined as the target audio data respectively.

Here, when the first audio data is completely input, it may be determined that the target application may get corresponding response information to the first audio data, and at this time, the first audio data may be directly determined as the target audio data. Likewise, when the input of the second audio data is complete, the second audio data may be determined as the target audio data. In this way, the target application may get response information associated with the first audio data and the second audio data, respectively.

In some embodiments, the method may further include the following operations.

AEC processing may be performed on the target audio data. Response information may be obtained based on the target audio data processed by AEC. The response information may be output.

In the process of audio processing, the electronic device may input an audio signal (music or message prompt tone) sent by the electronic device itself. At this time, the target audio data needs to be processed by AEC, and response information may be obtained based on the target audio data processed by AEC. Thus, the interference from the audio signal made by the electronic device can be reduced, and the accuracy and stability of the response information output by the target application can be ensured.

Here, the target audio data may be subjected to AEC based on an Automatic Speech Recognition (ASR) technology and an AEC technology.

In some embodiments, in order to reduce the probability of receiving environmental noise, environmental voice (sound made by users or others not directed to the target application), etc., the target audio data may also be processed based on the ASR technology and the NLP technology, to mask out the sound that is not made to the target application.

In some embodiments, the method may further include following operations.

Audio data to be detected may be acquired. Whether the audio data to be detected contains wake-up information for waking up the target application may be determined. The target application may be woken up when the audio data to be detected contains the wake-up information. The audio data may include voice data.

An audio signal may be collected by an audio collection component of the electronic device, and the audio signal may be digitized to obtain audio data. The audio collection component may be a component for collecting audio in the electronic device. For example, when the electronic device is a mobile phone, the audio collection component may be a microphone of the mobile phone.

The audio data to be detected may include: voice data obtained by digitizing the collected voice signal of a user. The wake-up information may be a preset wake-up word. The target application may be an application installed in the electronic device for performing voice interaction with the user, such as a voice assistant.

Specifically, when the audio signal sent by a user may be received based on the audio collection component of the electronic device, the voice signal may be digitized to obtain voice data, and whether the preset wake-up word is included in the voice data may be detected. The wake-up word may be set by the user according to demands. For example, the wake-up word may be set to "Ai."

The wake-up process may refer to controlling the target application to enter a working state from a sleep state, and after the target application is woken up, the audio data may be processed by the target application. In other embodiments, a wake-up operation input by a user may also be received by an icon, a shortcut key, or the like to wake up the target application.

In some embodiments, a voice assistant installed on a mobile phone is taken as an example. When a user performs voice interaction with the voice assistant on the mobile phone, the user may wake up the voice assistant by a setting instruction, and start speaking after waking up the voice assistant. The voice assistant will make a feedback according to the content of the user's speech.

The setting instruction may include at least one of the following: a set voice instruction, a trigger instruction for an icon on the mobile phone, and a trigger instruction for a shortcut key on the mobile phone. Here, for example, a user asks the voice assistant for the weather of today and tomorrow, and the main conversations may be as follows:

User: Ai (here, the voice assistant is woken up by a voice instruction, which may also be woken up by clicking icons, shortcuts, etc.)

Ai: I'm here/prompt tone (which is a response prompt)

User: How is the weather today?

Ai: The weather in Beijing today is . . . (broadcast the weather today)

User: Ai (here, the voice assistant is woken up by a voice instruction, which may also be woken up by clicking icons, shortcuts, etc.)

Ai: I'm here/prompt tone (which is a response prompt)

User: What about tomorrow?

Ai: The weather in Beijing tomorrow is . . . (broadcast the weather tomorrow)

In some embodiments, a user may wake up the voice assistant by a setting instruction, and start speaking after waking up the voice assistant. When the voice assistant predicts that the user may continue to speak after the user finishes a sentence, a microphone may be automatically turned on, after the voice assistant finishes replying, to receive the next instruction from the user. Here, for example, the user sets an alarm clock through the voice assistant, and the main conversations may be as follows:

User: Ai (here, the voice assistant is woken up by a voice instruction, which may also be woken up by clicking icons, shortcuts, etc.)

Ai: I'm here/prompt tone (which is a response prompt)

User: I want to set an alarm clock.

Ai: What time?

User: 7 pm.

Ai: Set, for you, an alarm clock at 7 pm.

Figure 2:
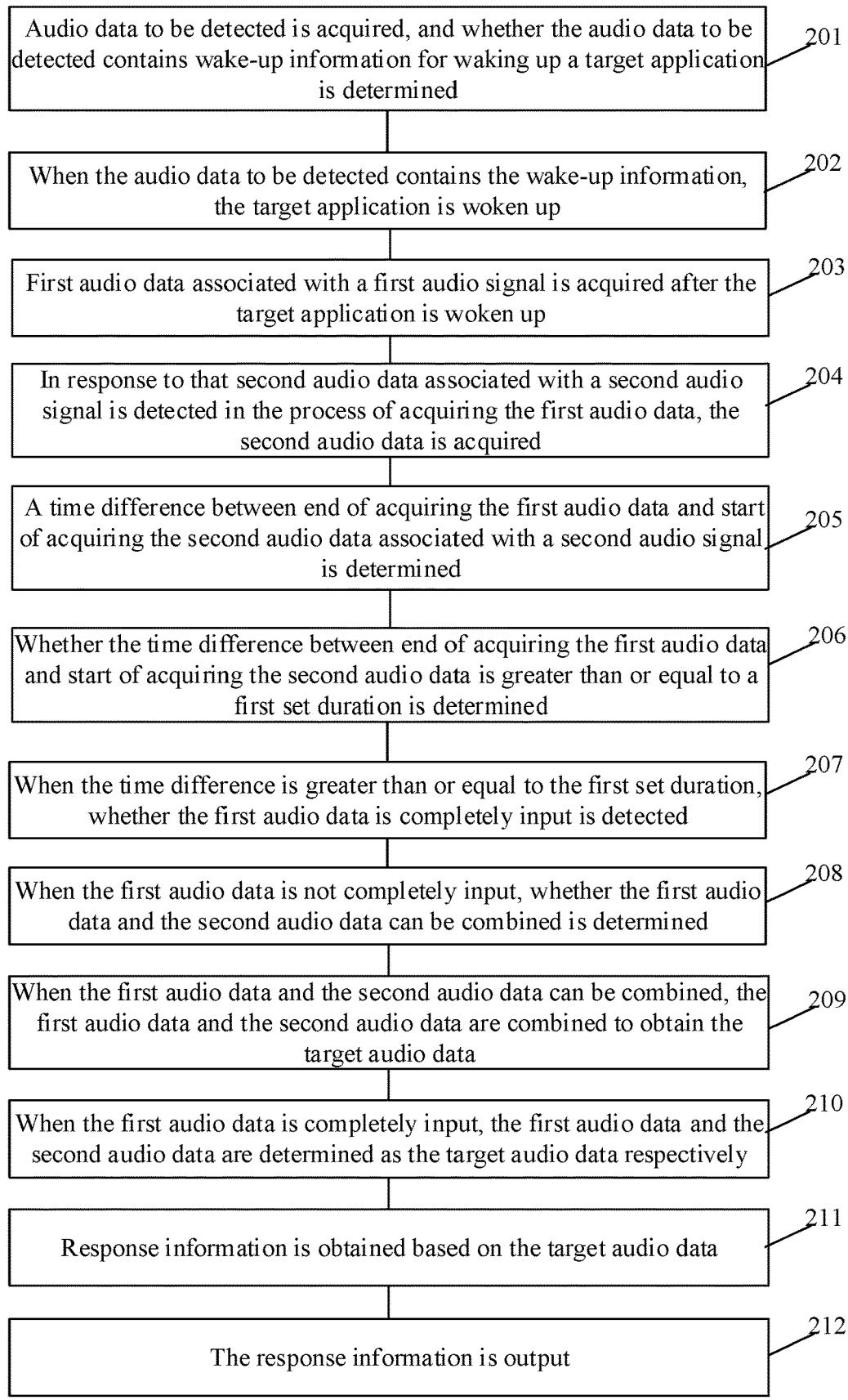
FIG. 2 is a flowchart 2 of an audio processing method according to some embodiments of the present disclosure.

FIG. 2 is a flowchart 2 of an audio processing method according to some embodiments of the present disclosure. As shown in FIG. 2, the method may include following operations.

In operation 201, audio data to be detected is acquired, and whether the audio data to be detected contains wake-up information for waking up a target application is determined.

An audio signal may be collected by an audio collection component of the electronic device, and the audio signal may be digitized to obtain audio data. The audio collection component may be a component for collecting audio included in the electronic device. For example, when the electronic device is a mobile phone, the audio collection component may be a microphone of the mobile phone.

The audio data to be detected may include: voice data obtained by digitizing the collected voice signal of a user. The wake-up information may be a preset wake-up word. The target application may be an application installed on the electronic device for performing voice interaction with a user, such as a voice assistant.

For example, when the audio signal sent by a user is received based on the audio collection component of the electronic device, the voice signal may be digitized to obtain voice data, and whether the preset wake-up word is included in the voice data may be detected. The wake-up word may be set by the user according to demands. For example, the wake-up word may be set to "Ai."

In operation 202, when the audio data to be detected contains the wake-up information, the target application is woken up.

The wake-up process may refer to controlling the target application to enter a working state from a sleep state, and after the target application is woken up, the audio data may be processed by the target application. In other embodiments, a wake-up operation input by a user may also be received by an icon, a shortcut key, or the like to wake up the target application.

In operation 203, first audio data associated with a first audio signal is acquired after the target application is woken up.

The first audio data may be audio data after digitizing the first audio signal. The first audio signal may be a voice signal sent by a user collected based on a sound collection component.

In operation 204, in response to that second audio data associated with a second audio signal is detected in the process of acquiring the first audio data, the second audio data is acquired.

In operation 205, a time difference between end of acquiring the first audio data and start of acquiring the second audio data associated with a second audio signal is determined.

In operation 206, whether the time difference between end of acquiring the first audio data and start of acquiring the second audio data is greater than or equal to a first set duration is determined.

In some embodiments, when the time difference between end of acquiring the first audio data and start of acquiring the second audio data is smaller than the first set duration, the first audio data and the second audio data are directly combined into target audio data.

There is a time difference between end of acquiring the first audio data and start of acquiring the second audio data, the target application cannot determine whether the first audio data and the second audio data are two sets of completely independent data or are two sets of data having relevance, and thus may not make an accurate response.

In the embodiments of the present disclosure, before the target audio data is obtained, the time difference between end of acquiring the first audio data and start of acquiring the second audio data may be determined, and then whether the first audio data and the second audio data are further processed may be determined, so that not only unnecessary processing of the acquired audio data can be reduced, but also more accurate response information may be got.

In operation 207, when the time difference is greater than or equal to the first set duration, whether the first audio data is completely input is detected.

Here, whether the first audio data is completely input may be detected based on an NLP technology. When it is detected that the first audio data is completely input, information associated with the first audio data may be obtained, and the response information may be output.

In operation 208, when the first audio data is not completely input, whether the first audio data and the second audio data can be combined is determined.

In operation 209, when the first audio data and the second audio data can be combined, the first audio data and the second audio data are combined to obtain the target audio data.

In operation 210, when the first audio data is completely input, the first audio data and the second audio data are determined as the target audio data respectively.

In operation 211, response information is obtained based on the target audio data.

In operation 212, the response information is output.

In some embodiments, the interaction between the target application and a user may be ended based on a received instruction for interaction termination. Here, the instruction for interaction termination may be input by voice, or by clicking an icon, or by a shortcut key, or the like.

In the embodiments of the present disclosure, after the target application is woken up, a user may directly talk to the target application at any time, so that the target application can respond to the input audio signals of the user in time during the continuous conversation. For example, when the user is listening to music, if the user is not satisfied with the music content provided by the target application, the user may directly say "Change"; when the user needs to continuously send a voice signal to the target application, the target application can continuously receive the voice signal and respond accordingly, without waking up the target application again and without waiting for the target application to completely output the response information to the previously received voice signal.

Figure 3:
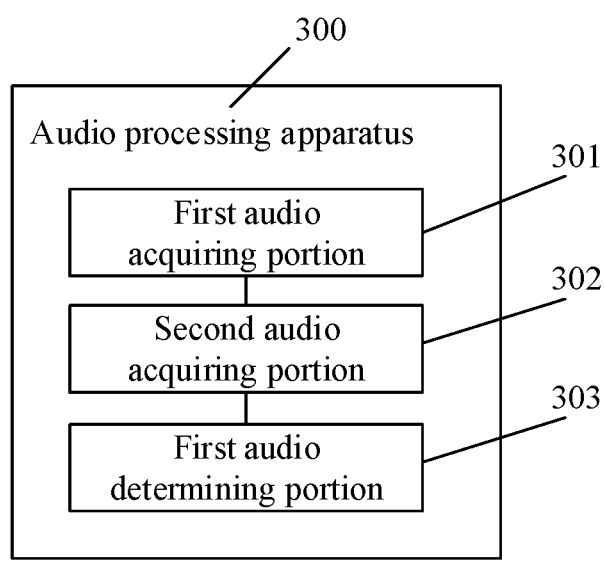
FIG. 3 is a block diagram of an audio processing apparatus according to some embodiments of the present disclosure.

FIG. 3 is a block diagram of an audio processing apparatus according to some embodiments of the present disclosure. As shown in FIG. 3, the audio processing apparatus 300 may include a first audio acquiring portion 301, a second audio acquiring portion 302, and a first audio determining portion 303.

The first audio acquiring portion 301 is configured to acquire first audio data associated with a first audio signal after a target application is woken up.

The second audio acquiring portion 302 is configured to acquire, in response to that second audio data associated with a second audio signal is detected in the process of acquiring the first audio data, the second audio data.

The first audio determining portion 303 is configured to obtain target audio data according to the first audio data and the second audio data.

In some embodiments, the apparatus 300 may further include a time determining portion.

The time determining portion is configured to determine a time difference between end of acquiring the first audio data and start of acquiring the second audio data.

The first audio determining portion may include an audio determining sub-portion.

The audio determining sub-portion is configured to obtain, when the time difference is greater than or equal to a first set duration, the target audio data according to the first audio data and the second audio data.

In some embodiments, the audio determining sub-portion is configured to:

detect, when the time difference is greater than or equal to a first set duration, whether the first audio data is completely input; and obtain, when the first audio data is not completely input, the target audio data according to the first audio data and the second audio data.

In some embodiments, the audio determining sub-portion is further configured to:

determine, when the first audio data is not completely input, whether the first audio data and the second audio data can be combined; and combine, when the first audio data and the second audio data can be combined, the first audio data and the second audio data to obtain the target audio data.

In some embodiments, the apparatus 300 may further include a second audio determining portion.

The second audio determining portion is configured to determine, when the first audio data is completely input, the first audio data and the second audio data as the target audio data respectively.

In some embodiments, the apparatus 300 may further include an AEC portion, a response portion and an output portion.

The AEC portion is configured to perform AEC processing on the target audio data.

The response portion is configured to obtain response information based on the target audio data processed by AEC.

The output portion is configured to output the response information.

In some embodiments, the apparatus 300 may further include a third audio acquiring portion, an information determining portion and a wake-up portion.

The third audio acquiring portion is configured to acquire audio data to be detected.

The information determining portion is configured to determine whether the audio data to be detected contains wake-up information for waking up the target application.

The wake-up portion is configured to wake up the target application when the audio data to be detected contains the wake-up information.

The audio data to be detected may include voice data.

With regard to the apparatus in the above embodiments, the specific manner in which the respective portions perform the operations has been described in detail in the embodiment relating to the method, and will not be explained in detail herein.

Figure 4:
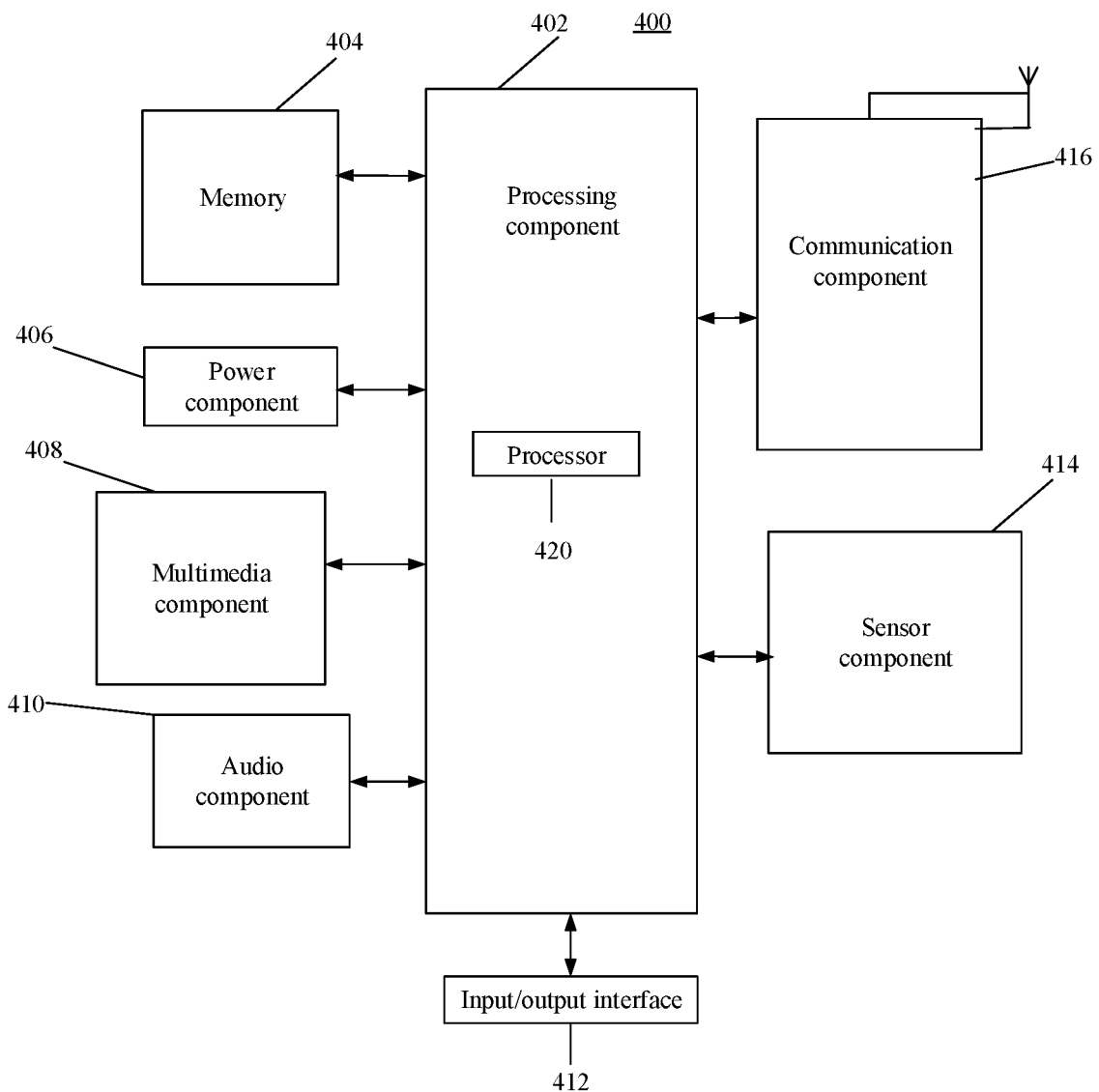
FIG. 4 is a block diagram of a hardware structure of an audio processing apparatus according to some embodiments of the present disclosure.

FIG. 4 is a block diagram of a hardware structure of an audio processing apparatus 400 according to some embodiments of the present disclosure. For example, the apparatus 400 may be a mobile phone, a computer, a digital broadcast terminal, a messaging device, a gaming console, a tablet, a medical device, exercise equipment, a personal digital assistant, and the like.

Referring to FIG. 4, the apparatus 400 may include one or more of the following components: a processing component 402, a memory 404, a power component 406, a multimedia component 408, an audio component 410, an input/output (I/O) interface 412, a sensor component 414, and a communication component 416.

The processing component 402 is typically configured to control overall operations of the apparatus 400, such as the operations associated with display, telephone calls, data communications, camera operations, and recording operations. The processing component 402 may include one or more processors 420 to execute instructions to perform all or part of the operations in the above described methods. Moreover, the processing component 402 may include one or more modules which facilitate the interaction between the processing component 402 and other components. For example, the processing component 402 may include a multimedia module to facilitate the interaction between the multimedia component 408 and the processing component 402.

The memory 404 is configured to store various types of data to support the operation of the apparatus 400. Examples of such data include instructions for any applications or methods operated on the apparatus 400, contact data, phonebook data, messages, pictures, video, etc. The memory 404 may be implemented using any type of volatile or non-volatile memory devices, or a combination thereof, such as an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 is configured to provide power to various components of the apparatus 400. The power component 406 may include a power management system, one or more power sources, and any other components associated with the generation, management, and distribution of power in the apparatus 400.

The multimedia component 408 may include a screen for providing an output interface between the apparatus 400 and the user. In some embodiments, the screen may include a liquid crystal display (LCD) and a touch panel (TP). In some embodiments, organic light-emitting diode (OLED) or other types of displays can be employed. When the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 408 may include a front camera and/or a rear camera. The front camera and the rear camera may receive an external multimedia datum while the apparatus 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone (MIC) configured to receive an external audio signal when the apparatus 400 is in an operation mode, such as a call mode, a recording mode, and a voice recognition mode. The received audio signal may be further stored in the memory 404 or transmitted via the communication component 416. In some embodiments, the audio component 410 further includes a speaker to output audio signals.

The I/O interface 412 is configured to provide an interface between the processing component 402 and peripheral interface modules, such as a keyboard, a click wheel, buttons, and the like. The buttons may include, but are not limited to, a home button, a volume button, a starting button, and a locking button.

The sensor component 414 may include one or more sensors to provide status assessments of various aspects of the apparatus 400. For example, the sensor component 414 may detect an open/closed status of the apparatus 400, relative positioning of components, e.g., the display and the keypad, of the apparatus 400, a change in position of the apparatus 400 or a component of the apparatus 400, a presence or absence of user contact with the apparatus 400, an orientation or an acceleration/deceleration of the apparatus 400, and a change in temperature of the apparatus 400. The sensor component 414 may include a proximity sensor configured to detect the presence of nearby objects without any physical contact. The sensor component 414 may also include a light sensor, such as a CMOS or CCD image sensor, for use in imaging applications. In some embodiments, the sensor component 414 may also include an accelerometer sensor, a gyroscope sensor, a magnetic sensor, a pressure sensor, or a temperature sensor.

The communication component 416 is configured to facilitate wired or wireless communication between the apparatus 400 and other devices. The apparatus 400 can access a wireless network based on a communication standard, such as Wi-Fi, 2G, 3G, 4G, or 5G, or a combination thereof. In one exemplary embodiment, the communication component 416 receives a broadcast signal or broadcast associated information from an external broadcast management system via a broadcast channel. In one exemplary embodiment, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer readable storage medium including instructions, which is included in the memory 404 for example, executable by the processor 420 in the apparatus 400, for performing the above-described methods. For example, the non-transitory computer-readable storage medium may be a ROM, a CD-ROM, a magnetic tape, a floppy disc, an optical data storage device, and the like.

A non-transitory computer-readable storage medium is provided. When an instruction in the storage medium is executed by a processor of an audio processing apparatus, the apparatus can be enabled to perform the audio processing method, which includes the following operations.

First audio data associated with a first audio signal may be acquired after a target application is woken up.

In response to that second audio data associated with a second audio signal is detected in the process of acquiring the first audio data, the second audio data may be acquired.

Target audio data may be obtained according to the first audio data and the second audio data.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described.

Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for determining target audio data during application waking-up, applicable to an electronic device, the method comprising:
   acquiring first audio data associated with a first audio signal, after waking up a target application;
   in response to that second audio data associated with a second audio signal is detected in the process of acquiring the first audio data, acquiring the second audio data;
   obtaining target audio data according to the first audio data and the second audio data; and
   determining a time difference between end of acquiring the first audio data and start of acquiring the second audio data,
      wherein the obtaining the target audio data according to the first audio data and the second audio data comprises:
      when the time difference is greater than or equal to a first set duration
         and the first audio data is completely input based on semantic analysis, determining the first audio data and the second audio data as two items of the target audio data respectively; and
      when the time difference is greater than or equal to a first set duration but the first audio data is not completely input based on the semantic analysis, and when the first audio data and the second audio data are capable of being combined, combining the first audio data and the second audio data to obtain the target audio data.

2. The method of claim 1, further comprising:
   performing Acoustic Echo Cancellation (AEC) processing on the target audio data;
   obtaining response information based on the target audio data processed by AEC; and
   outputting the response information.

3. The method of claim 1, further comprising:
   acquiring audio data to be detected;
   determining whether the audio data to be detected contains wake-up information for waking up the target application; and
   waking up the target application when the audio data to be detected contains the wake-up information,
   wherein the audio data to be detected comprises voice data.

4. An apparatus for determining target audio data during application waking-up, comprising:
   a processor; and
   a memory configured to store an instruction executable for the processor, wherein the processor is configured to:

control acquisition of first audio data associated with a first audio signal after a target application is woken up;

in response to that second audio data associated with a second audio signal is detected in the process of acquiring the first audio data, control acquisition of the second audio data;

determine a time difference between end of acquiring the first audio data and start of acquiring the second audio data;

when the time difference is greater than or equal to a first set duration and the first audio data is completely input based on semantic analysis, determine the first audio data and the second audio data as two items of target audio data respectively; and when the time difference is greater than or equal to a first set duration but the first audio data is not completely input based on the semantic analysis, and when the first audio data and the second audio data are capable of being combined, combine the first audio data and the second audio data to obtain target audio data.

5. The apparatus of claim 4, wherein the processor is further configured to:

perform AEC processing on the target audio data;

obtain response information based on the target audio data processed by AEC; and control output of the response information.

6. The apparatus of claim 4, wherein the processor is further configured to:

control acquisition of audio data to be detected;

determine whether the audio data to be detected contains wake-up information for waking up the target application; and wake up the target application when the audio data to be detected contains the wake-up information, wherein the audio data to be detected comprises voice data.

* * * * *